United States Patent Office 2,844,462
Patented July 22, 1958

2,844,462
RECOVERY OF ZINC

James L. Wyatt, Cleveland, Ohio, assignor to Horizons Incorporated, a corporation of New Jersey No Drawing. Application May 2, 1957
Serial No. 656,497

1 Claim. (Cl. 75—86)

This invention relates to a process for preparing zinc metal of high purity from metallic source materials having a substantial zinc metal content associated with metallic as well as non-metallic impurities.

Impure zinc metal, amenable to treatment by the present invention, includes oxidized zinc dusts such as blue powder; zinc drosses, e. g., from galvanizing pots; skimmings and other available impure industrial waste—or by-products.

This class of materials includes also, for example, mixtures of impure oxides interspersed with metal "prills" (coarse and fine granules) resulting from skimming the surface of zinc kettles, galvanizing troughs and the like. Both the metal "prills" and metal oxide residues may be considered as suitable feed materials for the recovery process about to be described. All such materials are generally characterized as possessing a metallic core of zinc or zinc-base alloy and a skin or surface layer of one or more zinc compounds, e. g., oxides or sulfates and even chlorides and the like. Prior efforts have been made to melt these residues in conventional melting furnaces, with very little success because of the difficulty in heating and melting the zinc compounds surrounding the zinc core. Another prior approach has been to process the residues to chemically remove the impure shell either by treatment with an acid or with a flux in which the impure shell dissolves. In such methods, in order to recover the purified zinc in a commercially useful form, it is necessary to separate the zinc from the residual film of purifying chemical treating agent and to remelt the zinc.

I have now discovered still another method of treating contaminated zinc materials by a combination of chemical and physical means to convert such materials to a commercial high-purity grade of zinc (99.99% grade). Briefly, in my process, the zinciferous material is charged into a fused salt melt wherein it is heated concurrently with the introduction of a reducing agent into the melt. The process is so conducted that when the contaminant skin has been separated from the metallic zinc contained in the impure material being processed, the zinc is caused to pass out of the melt as a vapor and thence to a condenser wherein it is recovered in the usual manner. One of the features of the present process is that the zinc content of the contaminant zinciferous non-metallic skin is, for the most part, reduced to metal and this newly formed metal plus that already present in the material being processed are recovered in the form of vapor passed out of the reduction reaction vessel.

Suitable melts into which the zinc residues may be charged include many of the alkaline earth metal halides and the alkali metal halides. One suitable composition is the eutectic mixture disclosed in the United States Patent 2,701,194, without the added fluoride. Other suitable melt compositions, preferred by me, are mixtures of alkali metal chlorides, particularly NaCl and KCl with or without LiCl, and NaCl or KCl without other addition agents. The essential characteristics of the halide melt are an ability to remain stable, that is to remain molten without excessive fuming at temperatures and pressures at which zinc may be evolved from the melt as a vapor, plus an ability to scavenge to some extent, oxides and other impurities associated with the crude material to be refined, and, finally, a chemical inertness toward both the reducing agent and the zinc products. The alkali chlorides are available commercially of a requisite purity and possess the desired combination of properties and form suitable melts.

The fused salt baths I prefer to use are those which are essentially inert chemically towards zinciferous non-metallic compounds, particularly the oxide, and thus my preferred baths are essentially only carriers which act as dispersants for the reactants under well controlled temperature and dispersion conditions. When the fused salt baths are pronounced solvents for the zinciferous compounds, not only is it more difficult to remove zinc as metal by reduction and distillation, but the salt bath builds up in soluble contaminants which will eventually reduce its efficiency to the point where it must be soon discarded. In the absence of such manifest chemical fluxing agents, the bath may be used substantially indefinitely.

A chloride or mixture of chlorides to be melted is charged into a crucible of graphite, silicon carbide or ceramic material. Covering the crucible is a cover having means for introducing any desired solid, liquid or gaseous materials into the space above the melt, and with means for introducing any such similar materials into the melt itself. Once the molten salt bath has been formed and an initial charge of crude zinc has been introduced into the melt, the process can be conducted either batchwise or in a continuous manner. The example which follows is illustrative of a single laboratory run, but is obviously capable of being modified so as to be run for an indefinite period.

*Example*

An initial charge was melted in a large Vycor glass test tube, the charge consisting of 55 grams of impure zinc skimmings and 200 grams of commercial sodium chloride (NaCl) which was maintained at a temperature between 900° C. and 950° C. during the run. To reduce any oxide associated with the zinc, a steady stream of natural gas was passed through a glass tube extending from the cover into the melt for about one hour. The rate of introduction of natural gas was maintained sufficient to show a steady stream of bubbles emerging from the melt. The product gases, containing some unreacted natural gas, some zinc vapor and some gases produced by reacting the oxidized charge material and the natural gas were passed into a cool (70° F.) glass vessel in which the zinc vapors condensed and through which the other gases passed without condensing. The natural gas was sparged into the melt for 1 hour and as a result 28 grams of skimmings were converted to zinc metal, which condensed in connecting arms and the glass condenser. The zinc recovered as a gray powder was found to be free from oxygen and was readily melted to form a soft metal button. Suitable liquid seals were used to prevent back diffusion of air into either the condenser or the reactor.

There has been described a process for recovering the zinc content of diverse materials, all of which consist of a metallic zinc core associated with a skin or covering layer of a non-metallic reducible zinc compound which comprises: heating and dispersing the crude material and reducing it while it is dispersed throughout a molten salt bath by forming a fused salt bath by melting at least one alkali metal halide and contacting the crude material with a reducing agent from the group consisting of carbon and carbon-containing gases while it is dispersed in the fused salt bath at a temperature and under a pressure such that the zinc metal in the system is evolved from the bath as a vapor.

While natural gas has been disclosed by way of example as the reducing agent, other reducing agents for zinc oxide may be used, including carbon monoxide or mixtures of reducing gases and finely divided elemental carbon particles, without departing from the present invention.

It should be noted further that the atmosphere above the fused melt into which zinc vapor is evolved may either be an inert atmosphere such as argon, or a reducing atmosphere and preferably should be at a pressure below atmospheric; but in any event, it must be an atmosphere in which the zinc vapor is not reoxidized and in which the zinc vapor is not condensed. In this manner, the vapor formed in the molten bath passes freely from the bath through a vapor space in which it is not substantially altered and thence to a collecting means such as a condenser from which it may be recovered.

In an earlier filed application Serial Number 489,783 I have disclosed the recovery of zinc from zinc ores by a procedure similar to that disclosed and claimed in the instant application.

I claim:

In a process for recovering the zinc content of zinc containing materials which consist of a metallic zinc core associated with a covering layer of non-metallic reducible zinc containing compounds which includes: forming an inert stable heating and dispersing medium consisting essentially of at least one halide from the group consisting of alkali metal halides and alkaline earth metal halides by melting said halide; introducing into said medium, an impure zinciferous crude material consisting of a metallic zinc core associated with a covering layer of non-metallic reducible zinc compounds; and while it is being dispersed and heated, contacting the said crude material with a reducing agent from the group consisting of carbon, carbon monoxide and hydrocarbon gases; and thereafter recovering the zinc metal product; the improvements which comprise: (1) maintaining an atmosphere above the heating and dispersing medium which is non-oxidizing toward zinc and (2) maintaining the heating and dispersing medium, the reducing agent and the dispersed crude material at a temperature and under a pressure such that the zinc metal in the system is evolved from the bath as a vapor, and (3) thereafter recovering the metallic zinc from the vapor evolved into said non-oxidizing atmosphere.

References Cited in the file of this patent

UNITED STATES PATENTS

| | | |
|---|---|---|
| 1,718,378 | Queneau | June 25, 1929 |
| 2,473,611 | Robson | June 21, 1949 |